Patented June 10, 1930

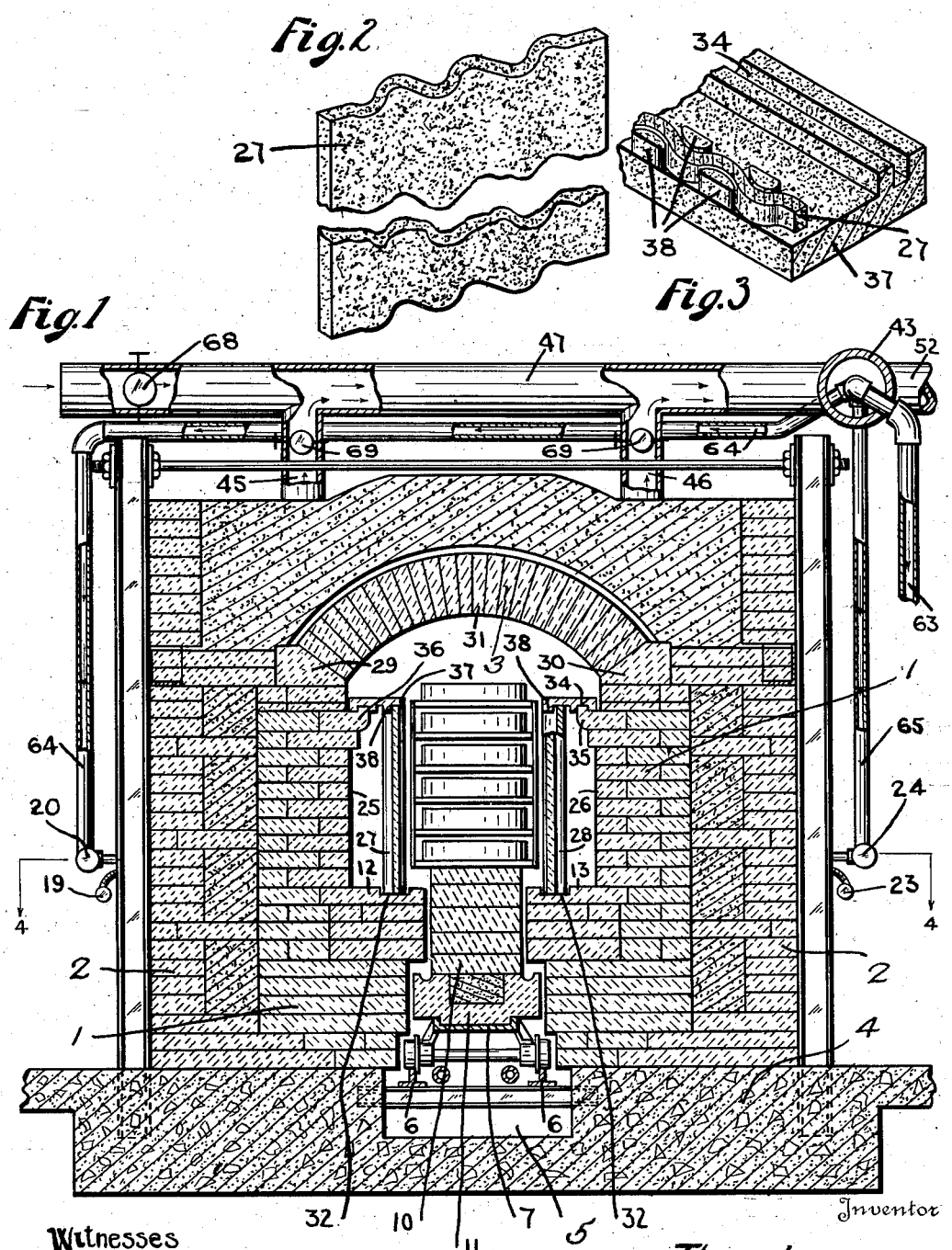

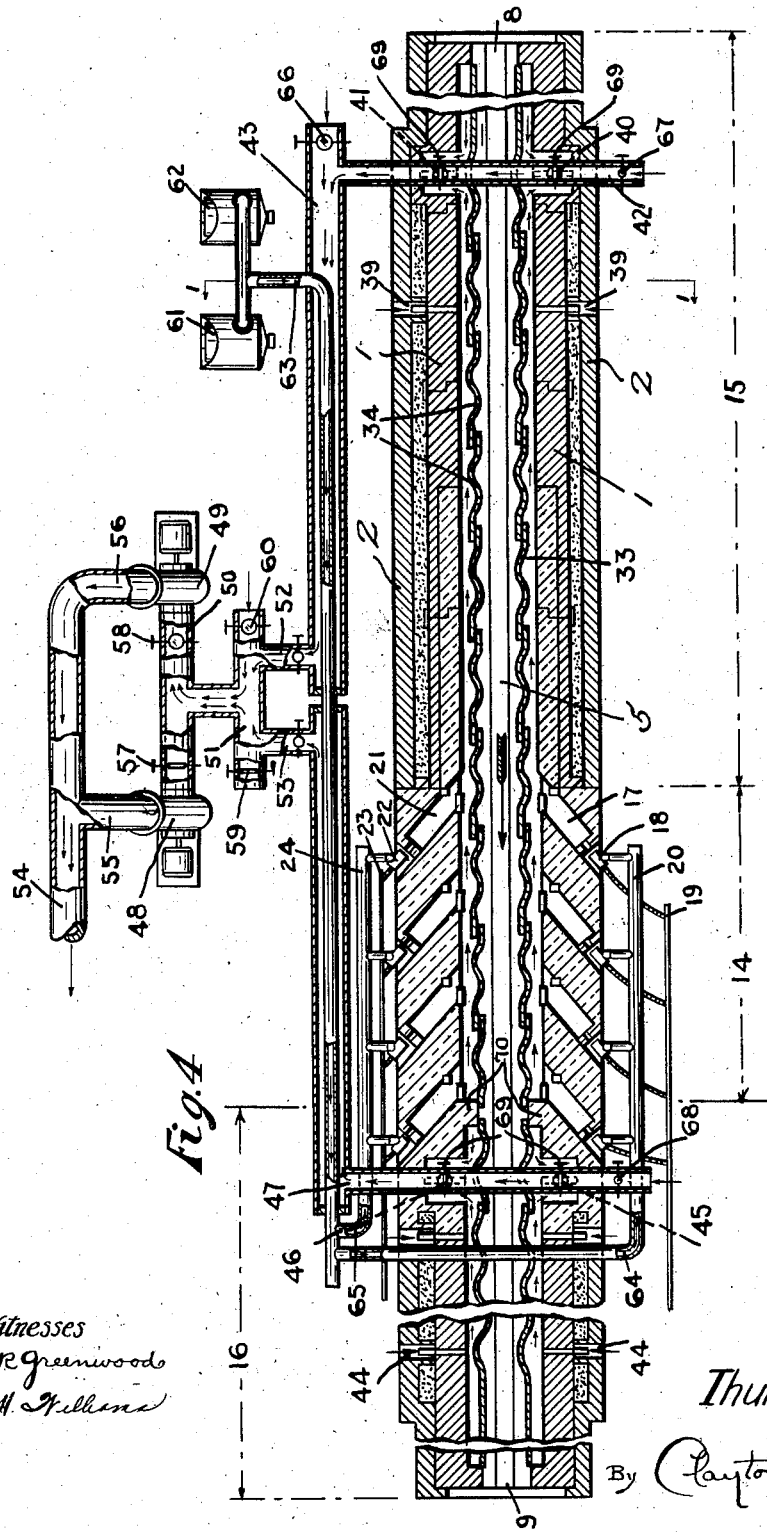

1,763,624

UNITED STATES PATENT OFFICE

THURE LARSSON, OF WORCESTER, MASSACHUSETTS, ASSIGNOR TO NORTON COMPANY, OF WORCESTER, MASSACHUSETTS, A CORPORATION OF MASSACHUSETTS

TUNNEL KILN

Application filed March 26, 1928. Serial No. 264,667.

The present invention relates to tunnel kilns, and more particularly to tunnel kilns of the muffle type.

In this type of kiln the ware to be heat-treated travels on cars between gas or oil heated muffles. The products of combustion generated in the firing zone ordinarily pass through pipe extensions of the muffles into a preheating zone, interposed between the firing zone and the entrance to the kiln, and therefore subjects the ware to an initial heat considerably less than the treating heat in the firing zone. This type of kiln is also provided with a cooling zone interposed between the exit to the kiln and the firing zone from which the cooling zone is separated so that the only heat in the cooling zone is produced by radiation from the heat-treated ware traveling therethrough.

Various types of muffle have been heretofore used to protect the ware from contact with the products of combustion, and numerous difficulties have been met in the attempt to provide an inexpensive and yet efficient muffle construction which will withstand the very high temperature to which the muffle must be subjected. One common form of muffle is a boxlike structure having double walls and intermediate partitions. This is expensive to make and there is considerable danger of breakage, during manufacture, handling and use owing to the fragile nature of the ceramic materials of which it is made.

It is extremely important that the kiln operate continuously and without interruption, since any enforced shutting down of its operation may result in the loss of a large amount of partially fired ware. Hence, it is highly desirable that the muffle be capable not only of transmitting heat readily to the ware, but it should above all be so constructed and arranged that it will not fail under normal firing conditions.

There is considerable waste of heat in the operation of a tunnel kiln, which should be avoided. It moreover is desirable to preheat the air furnished with the oil or gas for combustion, and an efficient system of heat interchange between the incoming air and the products of combustion is to be desired.

The principal object of the present invention is to provide a tunnel kiln of the muffle type which will be simple in its construction, inexpensive to build and efficient in its operation, and particularly to provide a muffle construction which is made up of plates and other simple parts capable of being easily assembled at the point of use.

Another object of the present invention is to provide a tunnel kiln with improved means for withdrawing the hot gases therefrom which are utilized to preheat the air used in the burners which heat the kiln.

To the accomplishment of these objects, and such others as may hereinafter appear, the various features of the present invention consist in certain devices, combinations and arrangements of parts fully set forth hereinafter, the advantages of which will be readily understood by those skilled in the art.

The various features of the present invention will be explained in connection with the accompanying drawings illustrating one embodiment of the invention, in which, Fig. 1 is a front sectional elevation of a tunnel kiln;

Fig. 2 is a fragmentary detail in perspective of the laterally corrugated partition which form the front wall of the muffle;

Fig. 3 is a fragmentary detail of the cap, in underside plan, the muffle partition being shown in section and partly broken away; and Fig. 4 is a somewhat diagrammatic sectional plan, taken partly on the line 4—4 of Fig. 1, with certain parts of the heat exchange system also shown partly broken away to illustrate the operation of the kiln.

The various features of the present invention are embodied in a tunnel kiln of the muffle type in which the combustion gases do not contact with the ware. In the specific form illustrated, a tunnel kiln is provided having foundation walls 1 upon which are built the outer vertical side walls 2 which are joined together by the roof 3 and held in place by means of suitable steel girders and cross rods. The foundation walls 1 and the side walls 2, which are composed principally of refractory bricks, are supported on a primary foundation 4 which is of concrete and extends throughout the entire length of the kiln. This concrete foundation is provided with a trench or is provided with rails 6 to facilitate the passage of a car 7, loaded with the ware to be treated, through the kiln from the entrance 8, Fig. 4, to the exit 9. The ware may be supported within saggers upon a body 10 of refractory blocks carried by a refractory base 11, supported by the car 7. On each side of the passage within which the car travels are the benches 12 and 13 built up of the brick work of the kiln. These benches form the bottoms of the muffles, as will be later described. To prevent undue transmission of heat from the heating chamber to the outside of the kiln and to better insulate the kiln, a layer of suitable material of low heat conductivity, such as diatomaceous earth, "Sil-o-Cel" or the like, is placed over the top of the roof wall and a similar filling is placed in the spaces within the side walls throughout the length of the kiln.

In the illustrated embodiment of the invention, the kiln is provided with three zones, namely, a firing zone 14, a preheating zone 15, (Fig. 4), and a cooling zone 16. Upon one side of the roadway the firing zone 14 is provided with a series of burners located in the spaces 17 in the furnace wall, each burner 18 being suitably supplied with liquid fuel or gas and air from headers 19 and 20, respectively. The opposite side of the kiln is also provided with another series of four combustion spaces 21, each of which is provided with a burner 22, to which liquid fuel or gas and air are supplied from headers 23 and 24, respectively.

The flame from the burners is enclosed in a muffle formed by the bench floors 12 and 13, the kiln walls 25 and 26 and a series of muffle plates 27 and 28 adjacent to the ware. The muffle plates are preferably made of ceramic bonded super-refractory granules, such as crystalline alumina or silicon carbide, and the kiln walls forming the sides and bottoms of the muffles may be made of similar material.

The tops of the walls 25 and 26 support skewbacks 29 and 30 for the arch 31, which extends over the ware-road 5 and forms the top of the kiln. In order to support the bottoms of the muffle plates, the benches 12 and 13 are each provided with a longitudinal channel 32 in which sections of the refractory muffle plates are inserted by engaging the bottom edge face of the partition loosely in the channel. Each muffle plate is preferably corrugated laterally, as shown in Fig. 2, in order to strengthen it and to increase the area of its exposed surface whereby heat is transferred from the combustion chamber to the ware in the road. As shown particularly in Fig. 1 the muffle plates in the channels 32 overlap one another throughout the length of the ware-road thus serving to partition the ware-road from the adjacent walls of the kiln throughout the three zones thereof.

In order to maintain the muffle plates in the channels 32, the walls 25 and 26, and their continuations throughout the length of the kiln, are each provided with a series of projecting blocks 35 having upstanding lugs 36 thereon. Bridging the space between the blocks 35 and the top of each muffle plate, is a movable cap 37 constructed to have a loose interfitting engagement with the lug 36 and a loose engagement with the top of the muffle plate. In this manner, the cap 37 is removably connected to walls 25 and 26 respectively, thus serving as a top to the muffle and a support for the muffle plate. As shown in Fig. 3, the bottom of the cap 37 is provided with a staggered series of depending lugs 38, arranged to loosely embrace the opposite side faces of the muffle plate. This cap 37 also has a channel 34 which interfits with the upstanding lugs on the blocks 35, thereby holding the cap securely in position.

With this construction the muffle plates are easily put into place and they effectively protect the ware from the products of combustion while allowing sufficient heat to be transmitted therethrough to treat the ware. In the event of an accident in the kiln any displaced ware will merely knock the loose partition and the loose cap down without injury resulting to the permanent structure of the benches, combustion or cooling chamber walls, or the arch and without danger of obstructing the passage of the ware train through and out of the tunnel. The partitions and caps are comparatively inexpensive and can be readily removed and replaced.

It will be observed that the muffles are made in two sections separated by partitions 70 so that the air in the muffles in the cooling zone does not mix with the burning gases in the heating zone. The air entering with the burning oil forms highly heated products of combustion, and if these are too hot to be passed safely through the valved passages to the heat exchange apparatus, cooling air may be introduced into the muffle through passages 39 in the furnace walls. These heated gases in the preheating zone 15 are withdrawn through vertical flues 40 and 41 connecting the combustion chamber with a horizontal flue 42 which discharges into the first section of a heat exchange device 43 in which the air for the burners is preheated.

In order to cool the zone 16, which is heated only by the heat radiating from the ware through the muffle plates 27 and 28, the walls in the zone 16 corresponding to the walls 25 and 26 in the firing zone are provided with a series of spaced vents 44 to permit fresh air to enter the muffle. This air is heated by the ware and then withdrawn from the cooling zone through dampered passages into the vertical flues 45 and 46 which connect the cooling zone with a horizontal flue 47 connected to the second section of the heat exchange device 43.

In order to withdraw the products of combustion and the heated air from the preheating zone and the heated air from the cooling zone, discharge them into the heat exchange device 43, and then withdraw them from the preheater and discharge them into the atmosphere, two blowers 48 and 49 are provided. Only one blower is used at a time, but in the event one of the blowers is put out of commission the emergency blower can be instantly cut into the induction system.

Both blowers are connected to a horizontal pipe or flue 50 which communicates with a short horizontal pipe 51 connected by short flues 52 and 53 to the first and second sections of the heat exchange device. The blower 48 discharges into a main exhaust flue 54, through a branch 55. The blower 49 discharges into the main exhaust flue 54 through a branch 56. As shown in Fig. 4 the flue 50 is provided with dampers 57 and 58. When the blower 48 is shut down the damper 57 is closed and the damper 58 is opened to permit the blower 49 to withdraw the products of combustion and the heated air from the zones 15 and 16 through the connections described. When the blower 49 is shut down the damper 57 is opened and the damper 58 is closed.

As the temperature of the material handled by the blowers is very high, provision is made allowing cool fresh air to flow directly into the flue 50. To this end the opposite ends of the pipe 51 are open to the atmosphere and these open ends are controlled by dampers 59 and 60.

In order to preheat the air for the burners in the heat exchange device 43, two fans 61 and 62, one for emergency, are provided. These fans discharge fresh air into a main 63 which for a portion of its length passes through both sections of the heat exchange device. The main 63 is connected by branches 64 and 65 to the hot air headers 20 and 24, respectively. With this arrangement the air for the burners is highly heated without intermixture with the products of combustion.

In order to control the temperature of the heat exchange device the first section thereof and the horizontal flues 42 and 47 have open ends provided with dampers 66, 67 and 68 respectively. When these dampers are closed the temperature is high but this temperature can be reduced by controlling the admission of fresh air into the system through these dampers. The vertical flues 40, 41, 45 and 46 likewise are each provided with a damper 69 for the purpose of controlling the rate of flow of the hot gases out of the muffles.

The operation of the kiln will be apparent from the above description. The ware laden cars are passed through the kiln from right to left, as indicated by the large arrow in the ware road in Fig. 4. Regulated amounts of oil and air are admitted to the burners and the products of combustion travel in the muffles toward the entering end of the kiln (Fig. 4) and through the passages regulated by dampers 69 into the flue 42 and thence into the outside pipe of the heat exchange device. Cold air may be admitted to these hot gases both in the muffles, by means of regulatable openings 39, and in the flue 42 by means of damper 67. The temperature of the heat exchange device may be regulated by damper 66.

Likewise, air is admitted to the cooling muffle in zone 16 through the succession of regulatable openings 44, of which there are a series along the sides of the kiln, and this air is drawn through the muffles, absorbing heat through the inner muffle wall plates, and then into the pipes 45, 46 and the cross pipe 47 into the second section of the heat exchange device. The temperature of the air entering the heat exchange device may be controlled by means of the dampered opening in the pipe 47. The air which goes to the burners passes through the inner pipe 63 and absorbs heat from the surrounding gases, and the temperature thereof may be regulated as desired.

The muffles, as explained, are formed primarily of the sections of overlapping muffle plates 27, 28 supported freely from the kiln side walls and muffle benches. The plates are held in place by the grooves 32 in the benches and by the caps which rest freely thereon. The joints may be packed with suitable refractory material, if desired, but it is nevertheless a fact that the muffle plates are free to move as they expand or contract. The plates are preferably strengthened by corrugations arranged vertically. The plates may be made in the simple form shown by ordinary ceramic operations and with the minimum danger of loss by breakage. Their composition may be determined by kiln requirements, as is well understood, but one satisfactory plate may be made of selected sizes of crystalline alumina grains bonded by highly refractory clays and other ceramic materials vitrified at a temperature above that to which they will be exposed during use.

It will be apparent to those skilled in the art that various changes may be made in the details of construction. The described and illustrated embodiment of the invention being intended as an exploitation of its underlying essentials, the features whereof will be definitely stated in their true scope in the claims hereto appended.

What I claim as new is:

1. A tunnel kiln comprising a combustion chamber, a burner associated with the chamber, conduits for conducting fuel and air to the burner, a heat exchange device independent of the kiln for preheating the air delivered to the burner, means for withdrawing the products of combustion from the combustion chamber and delivering them to the heat exchange device, an exit flue for said products of combustion leading from said device, and means for mixing a cooler gas with the products of combustion before they enter the exit flue.

2. A tunnel kiln comprising a firing zone and a cooling zone, a muffle in the cooling zone, a muffle and a burner therein in the firing zone, an air conduit to supply air to the burner, means for delivering fresh air into the muffle in the cooling zone, a heat exchange device to heat the air supplied to the burner muffle, and means for withdrawing the air heated in the cooling muffle and delivering it to the heat exchange device.

3. A tunnel kiln having a firing and a cooling zone, a muffle and a burner associated therewith in the firing zone, means for delivering air to the cooling zone, a preheating device having inlet and outlet conduits connected to discharge the products of combustion from the burner muffle and a conduit to supply preheated air to the burner, a blower in said outlet conduit, and means for mixing the air heated in said cooling zone with the products of combustion before they pass through the blower.

4. A tunnel kiln comprising a firing zone and a preheating zone connected so that the products of combustion generated in the firing zone pass through the preheating zone, a cooling zone, a muffle and a burner in the firing zone, an air conduit to supply air to the burner, means for delivering fresh air into the cooling zone, a sectional heat exchange device to preheat the air supplied to the burner, and means for withdrawing the products of combustion from the firing and the preheating zones and delivering them to one section of the heat exchange device and for withdrawing the air heated in the cooling zone and delivering it to the other section thereof.

5. In a kiln, a firing zone, a heat exchange device arranged to preheat air supplied to the kiln, means for withdrawing the products of combustion generated in the firing zone and delivering them to the heat exchange device, and means for controlling the temperature of the air heated by said device.

6. A tunnel kiln comprising a firing zone and a preheating zone connected so that the products of combustion generated in the firing zone pass through the preheating zone, a fuel burner and an air supply duct leading thereto in the firing zone, a cooling zone, means for delivering fresh air into the cooling zone, a sectional heat exchange device, means for withdrawing the products of combustion and the air heated in the preheating zone and delivering them to one section of said device, means for withdrawing the air heated in the cooling zone and delivering it to the other section of the heat exchange device, and means for differentially controlling the temperature in the sections of the heat exchange device.

7. A tunnel kiln comprising a firing zone and a preheating zone connected so that the products of combustion generated in the firing zone pass through the preheating zone, a heat exchange device, and means communicating with the preheating zone for withdrawing the products of combustion therefrom and delivering them to said device, including a flue and controllable means for admitting fresh air to the flue.

8. A tunnel kiln comprising a firing zone and a preheating zone connected so that the products of combustion generated in the firing zone pass through the preheating zone, a heat exchange device, means communicating with the preheating zone for withdrawing the products of combustion therefrom and delivering them to said device, and controllable means for admitting fresh air to the heat exchange device to modify the temperature thereof.

9. A tunnel kiln comprising a firing zone provided with a series of burners on opposite sides and at different locations longitudinally thereof, means for delivering fuel to the burners, branch air pipes for delivering air to the two series of burners, a main connected to the branches, a heat exchange device for heating the air in the main, means for withdrawing the products of combustion generated in the firing zone from the kiln and delivering them to said device, and means to mix cool air with said products of combustion before they are passed to the exterior atmosphere.

10. A tunnel kiln having a firing zone, a muffle and a burner associated therewith in said firing zone, a preheating device having inlet and outlet conduits connected to discharge the products of combustion from the muffle and a conduit for delivering preheated air to the burner, a blower in said outlet conduit, and means for supplying a cooler gas to cool the products of combustion before they enter the blower.

11. A tunnel kiln having a firing zone, a muffle and a burner associated therewith in said firing zone, conduits for conducting fuel and air to the burner, an outlet conduit connected to discharge the products of combustion from the muffle, a blower in said outlet conduit, and regulatable means for supplying a cooler gas to cool off the products of combustion before they enter the blower.

12. A tunnel kiln comprising a bench, a kiln wall rising therefrom, and a cap projecting laterally from the wall adjacent its top, and a muffle plate interposed loosely between the bench and the cap.

13. A tunnel kiln comprising a bench, a kiln wall rising therefrom, a cap loosely supported from the wall near its top and projecting laterally therefrom, and a corrugated muffle plate of super-refractory material interposed loosely between the bench and the cap.

14. A tunnel kiln comprising a channeled bench, a kiln wall rising therefrom, and a cap projecting laterally from the wall adjacent to its top, said cap having on its lower face a plurality of staggered lugs, and a laterally corrugated refractory muffle plate having its bottom edge engaged in the bench channel and having its top edge engaged with the cap between the lugs which embrace the opposite side faces of the muffle plate.

15. A tunnel kiln comprising a bench, a kiln wall rising therefrom and having a projecting portion near the top, a corrugated muffle plate of refractory material resting loosely on the bench, and a cap loosely supported on said portion of the wall and the plate and holding the plate in position.

16. A tunnel kiln comprising side, top and bottom walls defining a chamber through which ware may be transported, a bench forming the bottom of a muffle and a refractory plate supported on the bench and cooperating with a side wall to form a muffle, and a movable cap removably connected to the side wall, which forms the top of the muffle and serves to support the muffle plate.

17. A tunnel kiln comprising side, top and bottom walls defining a chamber through which ware may be transported, a bench forming the bottom of the muffle, a series of corrugated refractory plates supported on the bench and members loosely supported from the kiln side walls which engage and hold the tops of the plates in position and form the top of the muffle.

18. A tunnel kiln muffle comprising a bottom and two side walls arranged to form an extensive combustion chamber, said bottom and a side wall having a groove and a portion interfitting therewith, and a removable cap having a portion interfitting with the top of one side wall to connect it with the other.

Signed at Worcester, Massachusetts, this 22nd day of March, 1928.

THURE LARSSON.